Oct. 26, 1943.                A. JOHNSON                 2,332,642
                           COLLAPSIBLE DISPLAY
                          Filed Dec. 16, 1940              6 Sheets-Sheet 1
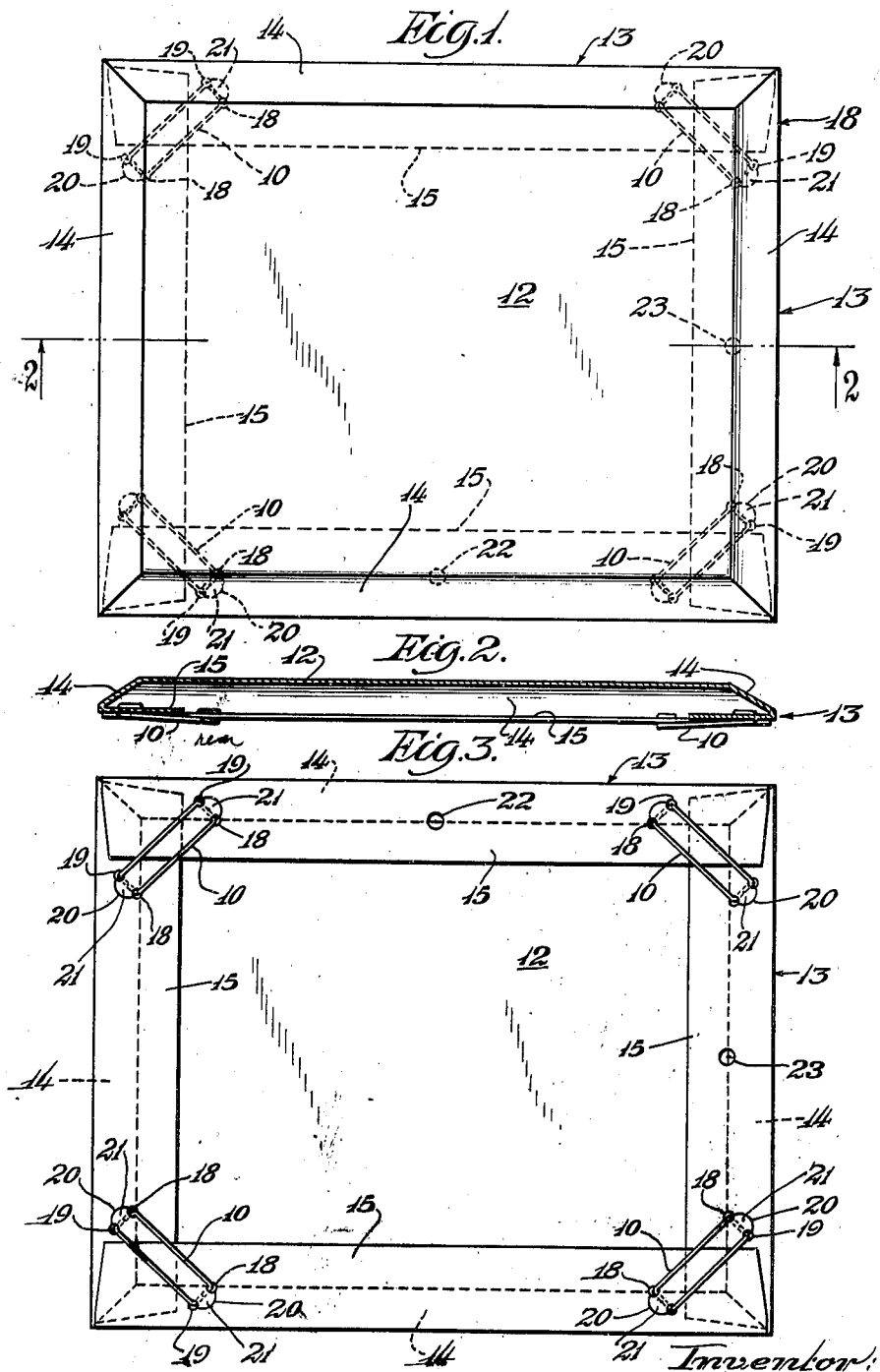
Inventor:
Arnold Johnson
by Lee J. Gary
Attorney

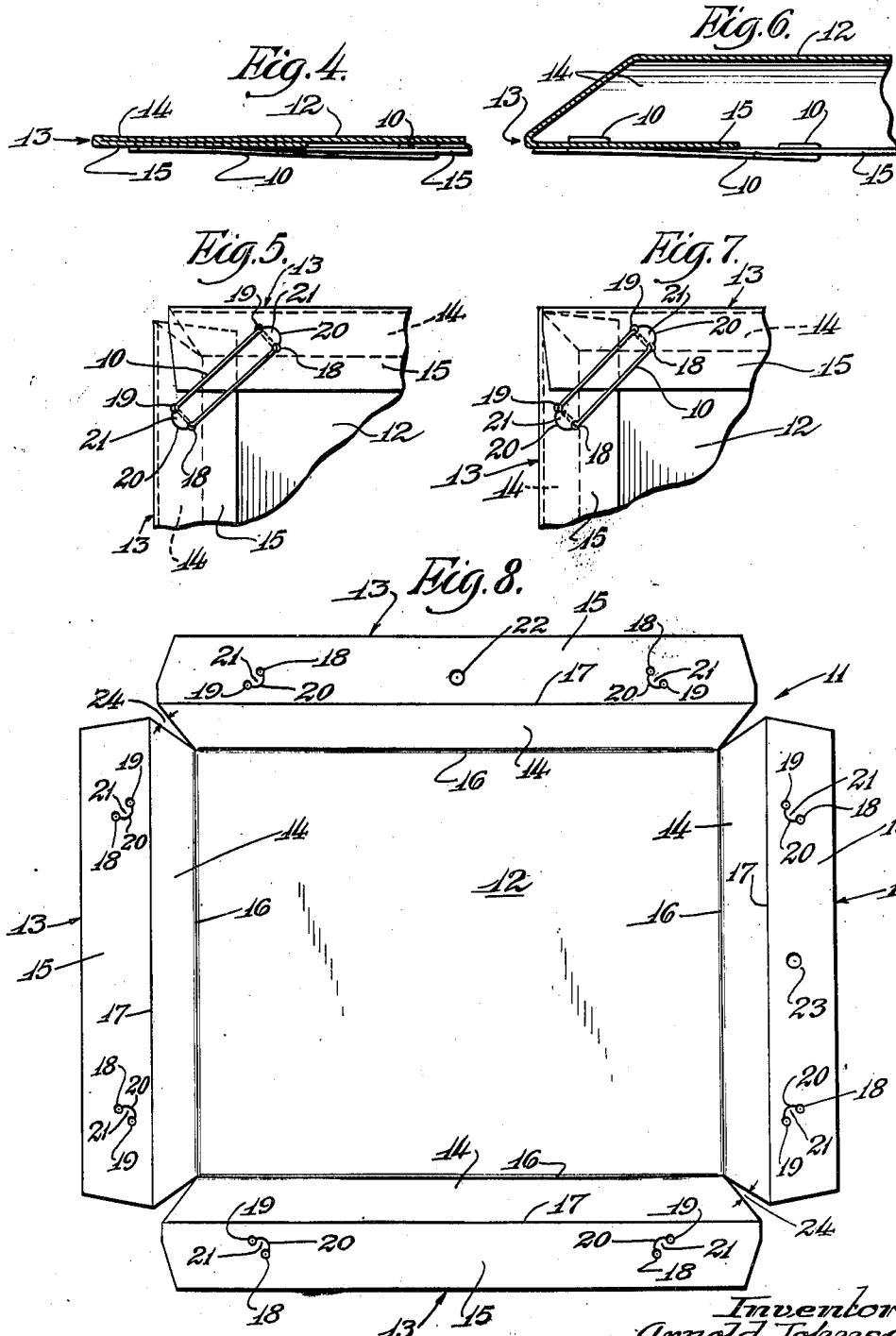

Oct. 26, 1943.  A. JOHNSON  2,332,642
COLLAPSIBLE DISPLAY
Filed Dec. 16, 1940  6 Sheets-Sheet 3

Inventor
Arnold Johnson
By Lee J. Gary
Attorney

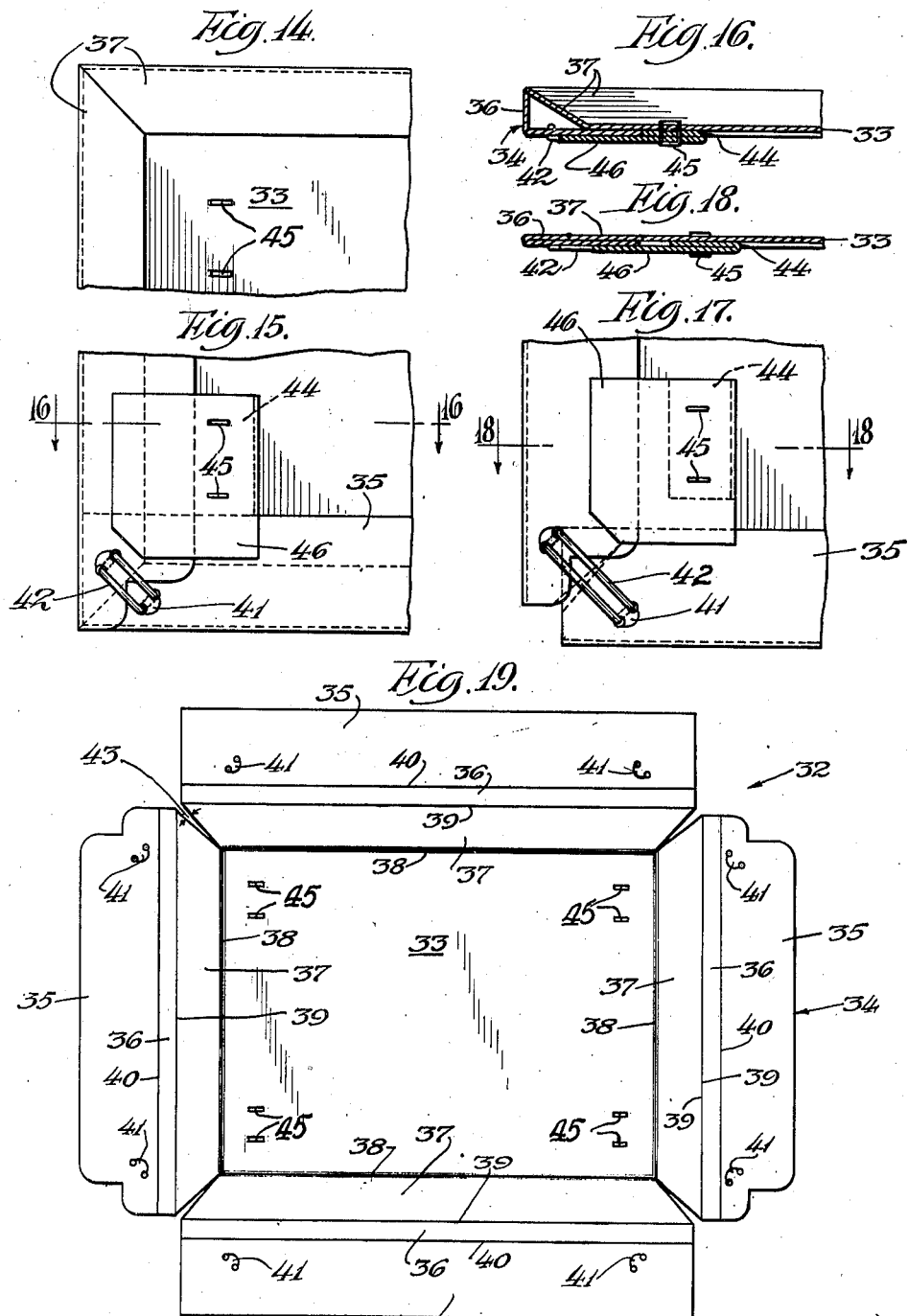

Oct. 26, 1943.　　A. JOHNSON　　2,332,642
COLLAPSIBLE DISPLAY
Filed Dec. 16, 1940　　6 Sheets-Sheet 5

Inventor:
Arnold Johnson
By Lee J. Gary
Attorney

Oct. 26, 1943.　　　A. JOHNSON　　　2,332,642
COLLAPSIBLE DISPLAY
Filed Dec. 16, 1940　　　6 Sheets-Sheet 6
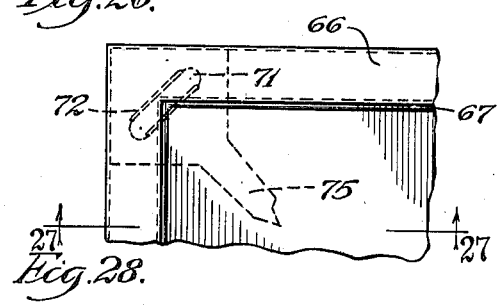
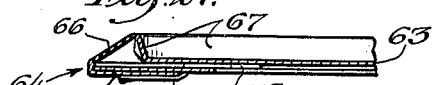
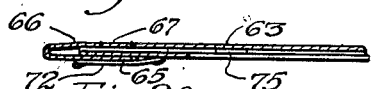
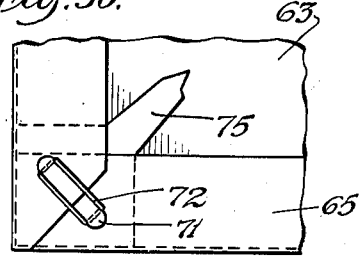
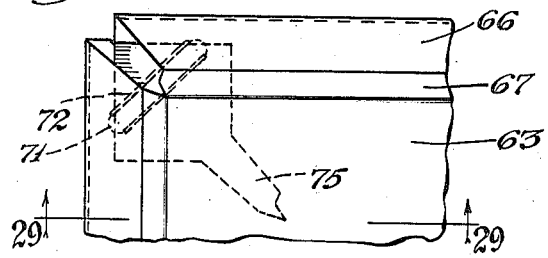
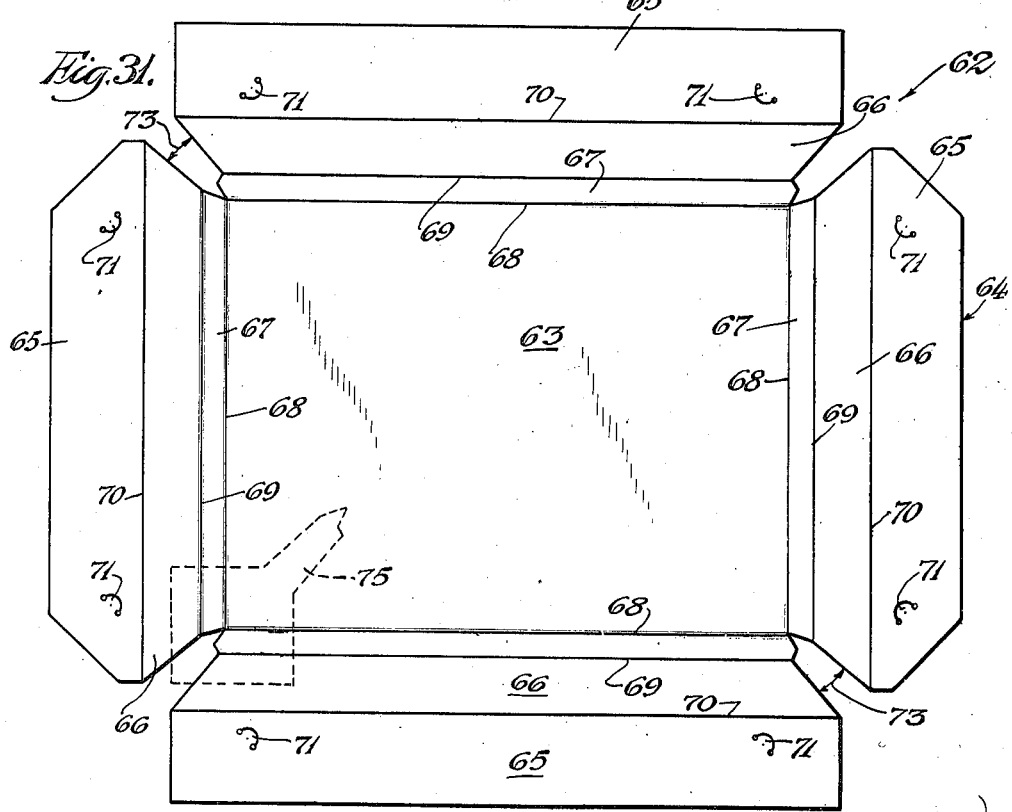
Inventor
Arnold Johnson
By Lee J. Gary
Attorney Patented Oct. 26, 1943

2,332,642

UNITED STATES PATENT OFFICE 2,332,642

COLLAPSIBLE DISPLAY

Arnold Johnson, Chicago, Ill., assignor to Arvey Corporation, Chicago, Ill., a corporation of Illinois Application December 16, 1940, Serial No. 370,313

24 Claims. (Cl. 40—154)

This invention relates to improvements in collapsible frame and plaque displays, and particularly to a display construction which can be rapidly and conveniently assembled or set up and locked in assembled or set-up position by the manufacturer, which thereafter can be collapsed for economy in transportation without disengagement of the assembly locking means, and after which it is self-setting-up to the ultimate user of the display.

In the collapsible cardboard display art it has heretofore been the practice for the manufacturer to ship the displays in knock-down condition for economy in transportation, which thereafter required manual operations of varying degree of skill to thereafter lock the displays in set-up position by means of cardboard locks, inclosing means, cords and the like.

It is an object of the present invention to provide a framed display the frame portion of which can be completely assembled and locked in set-up position by the manufacturer thereof and thereafter collapsed into a minimum of space for economy of shipment and transportation, yet withal one which thereafter springs into extended or operative set-up position when released, without manual manipulation or the requirement of skill or expenditure of time by the installer or user thereof, with the resultant additional assurance that the display will be used and maintained in the manner intended.

Other objects of my invention relate to the details of construction, arrangement of parts, and other advantages which will be apparent from a consideration of the following specification and drawings, wherein:

Fig. 1 is a face view of a collapsible cardboard display illustrating an embodiment of my invention.

Fig. 2 is a sectional view taken on the line 2—2 of Fig. 1.

Fig. 3 is a rear view of the display illustrated in Fig. 1.

Fig. 4 is a fragmentary sectional view of the display in assembled but collapsed position.

Fig. 5 is a fragmentary rear view of the display in assembled but collapsed position of Fig. 4.

Fig. 6 is a fragmentary sectional view of the display in assembled and extended position.

Fig. 7 is a fragmentary rear view of the display in the position of Fig. 6.

Fig. 8 is a development of the display blank.

Fig. 14 is a fragmentary face view of a collapsible cardboard display illustrating another embodiment of my invention.

Fig. 15 is a fragmentary rear view of the display illustrated in Fig. 14, in assembled and extended position.

Fig. 16 is a section on the line 16—16 of Fig. 15.

Fig. 17 is a fragmentary rear view of the display illustrated in Figs. 14 to 16 in assembled but collapsed position.

Fig. 18 is a section on the line 18—18 of Fig. 17.

Fig. 19 is a blank development of a display illustrated in Figs. 14 to 18.

Fig. 26 is a fragmentary face view of a display illustrating another embodiment of my invention.

Fig. 27 is a section on the line 27—27 of Fig. 26.

Fig. 28 is a fragmentary face view of the display illustrated in Fig. 26 but in collapsed position.

Fig. 29 is a section on the line 29—29 of Fig. 28.

Fig. 30 is a fragmentary rear view of the display illustrated in Fig. 26 in assembled and extended position.

Fig. 31 is a blank development of the display illustrated in Figs. 26 to 30.

Figure 9:
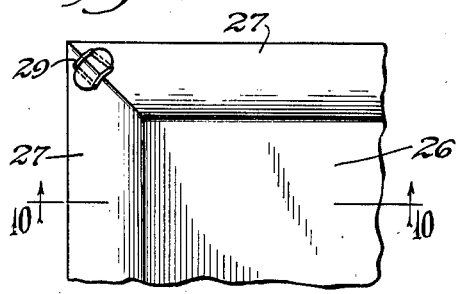
Fig. 9 is a fragmentary back view of a modified form of display in assembled and extended position.

Referring to the drawings, with specific reference to Fig. 8 thereof, this form of my display construction comprises a blank generally indicated as 11 which consists of a central rectangular panel 12 to each side of which a side-piece 13 is integrally attached. Each side-piece 13 comprises a relatively narrow panel 14 and a wider panel 15. Score lines 16 divide the center panel 12 from the relatively narrow panels 14 and a score line 17 divides each panel 14 from the adjoining panel 15.

The blank illustrated in Fig. 8 is viewed from the front face thereof and the score lines 16 and 17 are cut upon the front face. In assembling the blank 11 to form the display piece generally indicated as 18, the panels 15 are folded backwardly, as viewed in Fig. 8, along the score lines 17 until the panels 15 lie in a position in plane-parallel relationship with the outer panel 12 and closely adjacent the rear face thereof. This is the form the display takes when in collapsed position as shown in Figs. 4 and 5.

Each of the four relatively wide terminal panels 15 are provided with a pair of spaced apertures 18 and 19 adjacent each of their ends, each pair of apertures being connected together by an arcuate shaped slit 20 resulting in a tongue-like anchor piece 21. To set up the display the blank is folded as previously set forth, and then a rubber band 10 is engaged over an adjacent pair of tongues 21 so as to extend angularly between and rearwardly over the end portions of two adjacent panels 15, the rubber band being sufficiently short so as to engage and hold the said panels under tension. Thus immediately upon application of a rubber band 10 to each of adjacent pairs of tongues 21 at each of the four corners of the rear face of the display, the tension of the bands draws the side panels 15 toward each other thereby buckling the center panel 12 and panels 14.

This buckling effect is taken up by the score lines 16 whereby the panels 14 dispose themselves obliquely to the plane of the face of the central panel 12 as shown in Fig. 6 and come into endwise abutment at an angle determined by the cut-out portions 24 defining the oblique angles of the adjacent ends. Although the abutment of the adjacent oblique angled ends of two panels 14 under the tension of a band 10 is generally sufficient in operative use to maintain the frame forming panels in alignment, the overlapping of the ends of the panels 15 and the abutment of an end of one lower panel 15 within the other at the score 17, as best illustrated in Figs. 5 and 7, serves to bolster the alignment of the panels in their oblique set-up position.

In this manner the entire display may be formed and rapidly, securely and economically assembled by the manufacturer. One of the prime reasons for making displays of this nature in collapsible form of course is to enable them to be shipped economically in the smallest amount of space, as it will readily be seen that the display as originally folded has a thickness such as illustrated in Fig. 4 and when set-up expands as illustrated in Fig. 6. However, by forming and assembling the display in accordance with my herein set forth invention, for the purpose of shipment or storage, it is not necessary to disengage any of the parts after complete assemblage. All that is required to collapse the display is to press the face of the center panel 12 downwardly so that it lies against the panels 15, acting against the tension of the bands 12. Thus a number of displays may be collapsed against each other so that each collapses from the extended condition of Fig. 6 to the collapsed condition of Fig. 5, and secured together, or one or more collapsed displays may be so held in a box or package. On withdrawal the display will immediately extend and become self set up by action of the engaged rubber bands 10, without the requirement of skill or expenditure of time.

For the purpose of mounting the display in a suspended position there is provided an aperture 22 in one panel 15, and another 23 in an adjacent panel 15. If desired, each of these apertures 22 or 23, may comprise a pair of apertures to receive a mounting cord.

Figure 13:
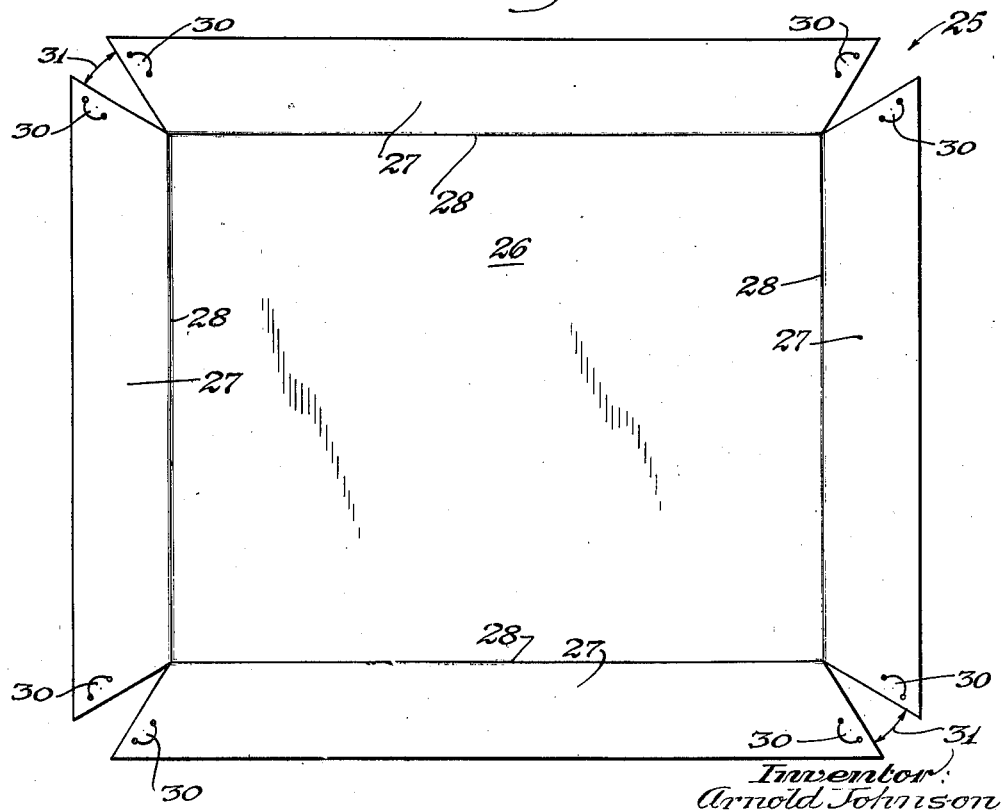
Fig. 13 is a blank development of the display illustrated in Figs. 9 to 12.
Figure 20:
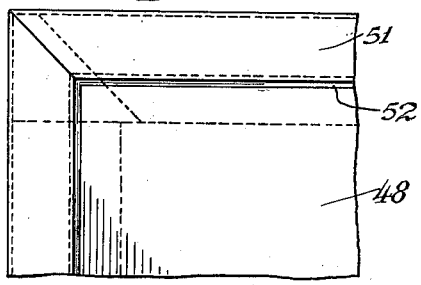
Fig. 20 is a fragmentary face view of a collapsible cardboard display illustrating another embodiment of my invention.
Figure 22:
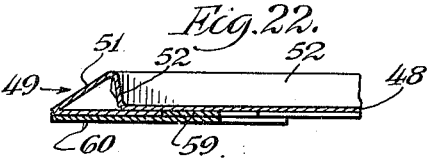
Fig. 22 is a section on the line 22—22 of Fig. 21.
Figure 24:
Fig. 24 is a section at the line 24—24 of Fig. 23.
Figure 21:
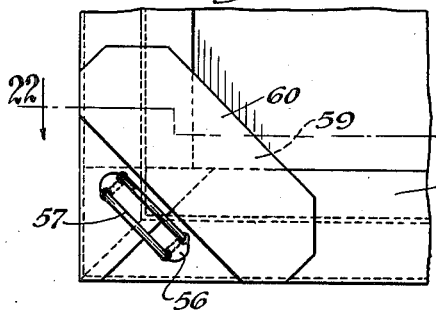
Fig. 21 is a fragmentary rear view of a display illustrated in Fig. 20 in assembled and extended position.

Figs. 9 to 13 illustrate another form of collapsible cardboard display embodying my invention. This display comprises a blank generally indicated as 25, which consists of a central rectangular panel 26 to each side of which is integrally attached a sidepiece panel 27. The blank illustrated in Fig. 13 is viewed from the front face thereof, and the score lines 28 dividing the central panel 26 from the side-piece panels 27 are cut on the rear face.

Figure 10:
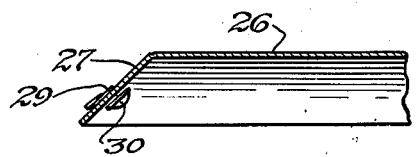
Fig. 10 is a section on the line 10—10 of Fig. 9.
Figure 11:
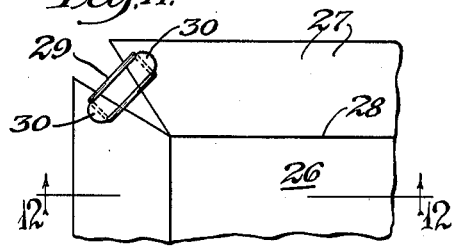
Fig. 11 is a fragmentary back view of the display illustrated in Fig. 9, in assembled but collapsed position.
Figure 12:
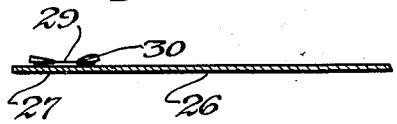
Fig. 12 is a section on the line 12—12 of Fig. 11.

To set up this display, a rubber band 29 is engaged over an adjacent pair of tongues 30 so as to extend angularly over the end portions of two adjacent panels 27, the rubber band being sufficiently short so as to engage and hold said panels under tension. Thus, immediately upon application of the rubber band 29 to each of the adjacent pairs of tongues 30 at each of the four corners of the front face of the display the tension of the bands draws the side panels 27 toward each other thereby buckling the center panel 26, the buckling effect being taken up by the score lines 28 whereby the panels 27 dispose themselves obliquely to the plane of the face of the central panel 26 as shown in Figs. 9 and 10. The central panel 26 which is adapted to carry an illustration on its face is thus framed by the obliquely disposed panels 27 which comes into endwise abutment at an angle determined by the cut out portions 31, defining the oblique angles of the adjacent ends of the panels 27.

Figs. 14 to 19 illustrate another form of collapsible cardboard display embodying my invention. This display comprises a blank generally indicated as 32 which consists of a central rectangular panel 33 to each side of which the side piece 4 is integrally attached. Each side piece comprises an outermost panel 35 and intermediate panels 36 and 37. Score lines 38 divide the central panel 33 from the panel 37, and the panels themselves are divided by the score lines 39 and 40.

The blank illustrated in Fig. 19 is viewed from the front face thereof, and the score lines 39 and 40 being cut upon the front face thereof and the score lines 38 cut upon the rear face thereof. In assembling the blank 32 to form the display piece, as best illustrated in Figs. 14 to 16, the panels 35 are folded backwardly as viewed in Fig. 19 along the score lines 40 until the panels 35 lie in a position in plane parallel relationship with the central panel 33 and closely adjacent the rear face thereof. This is the form the display takes when in collapsed position as shown in Figs. 17 and 18.

The four outermost terminal panels 35 are formed with tongue-like anchor pieces 41 adjacent each of their ends. To set up the display the blank is folded as previously set forth and then a rubber band 42 is engaged over an adjacent pair of tongues 41 so as to extend angularly between and over the end portions of adjacent panels 35, the rubber band being sufficiently short so as to engage and hold the panels under tension. Thus immediately upon application of a rubber band 42 at each of the four corners of the rear face of the display, the tension of the bands draws the side panels 34 toward each other, thereby buckling the center panel 33 and the intermediate panels 36 and 37. This buckling effect is taken up by the scores lines 38 and 39, whereby the panels 37 dispose themselves obliquely to the plane of the face of the central panel 33, and the panels 36 dispose themselves substantially perpendicular to the face of the central panel 33, as shown in Fig. 16. The panels 37 come into endwise abutment at an angle determined by the cut-out portions 43 defining the oblique angles of the adjacent ends of the panels 37, and the panels 36 are permitted to come into abutment in a position substantially perpendicular to the plane of the main panel 33.

Although the abutment of the adjacent oblique angle ends of panels 37 under the tension of the bands 42 is generally sufficient in operative use to maintain the frame-forming panels in alignment, I provide, as shown in this modification of my invention, auxiliary bolstering and abutment means secured to the rear face of the panel 33 prior to the buckling of the side panels into their operative position by the rubber bands for maintaining the set-up alignment of the several framing panels comprising the side pieces 34. This auxiliary abutment and aligning means comprises a strip of material 44, which may suitably be of cardboard similar to that which comprises the display, secured to the rear face of the central panel 33 adjacent to and inwardly of the score line 38 defining panel 33. This member 44 may suitably comprise a rectangular strip of material positioned and secured to the panel 33 by suitable means such as the staples 45 so that the sides thereof are parallel to the sides of the panel 33 and positioned at a point spaced from the sides thereof a distance equal to that at which the panels 35 normally come to rest under the tension of the bands 42 and the limiting position of the panels 37 defined by the angle of the cut out portion 43, as will be observed in Fig. 15.

Superimposed over the auxiliary abutment strip 44 and secured thereto by means of the same staples 45, is an additional piece of material 46, which likewise may be of cardboard, of generally rectangular form of sufficient size so that it projects laterally from the defining edges of the main panel 33 and overlaps an adjacent pair of panels 35 in both the buckled and collapsed position of the side pieces 34. If desired, the pieces 44 and 46 may be formed integral of a single sheet of material folded over and secured together by the staple or stitch 45. This overlap member 46 serves as a guide for the panels 35 under the tension of the bands 42, in their sliding action and serves to maintain the said panels in position whereby they may effectively abut against the abutment strip 44 and in general serves as the further auxiliary aid in guiding the movement of the component portions of the side pieces and to bolster them as an aid in their framing alignment with the main panel 33.

Figs. 20 to 25 illustrate another form of collapsible cardboard display embodying my invention. This display comprises a blank generally indicated as 47 which consists of a central rectangular portion 48 to each side of which is integrally attached a side piece 49. Each side piece 49 comprises an outermost panel 50 and intermediate panels 51 and 52. A score line 53 divides the panels 52 from the main panel 48, and the score lines 54 and 55 divide the remaining panels.

Figure 23:
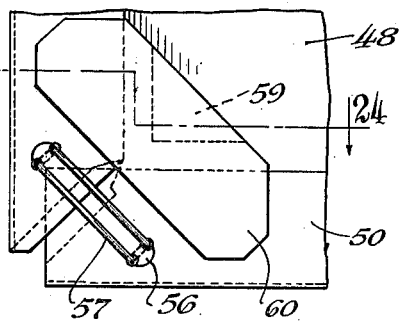
Fig. 23 is a fragmentary rear view of a display illustrated in Fig. 20 in assembled but collapsed position.
Figure 25:
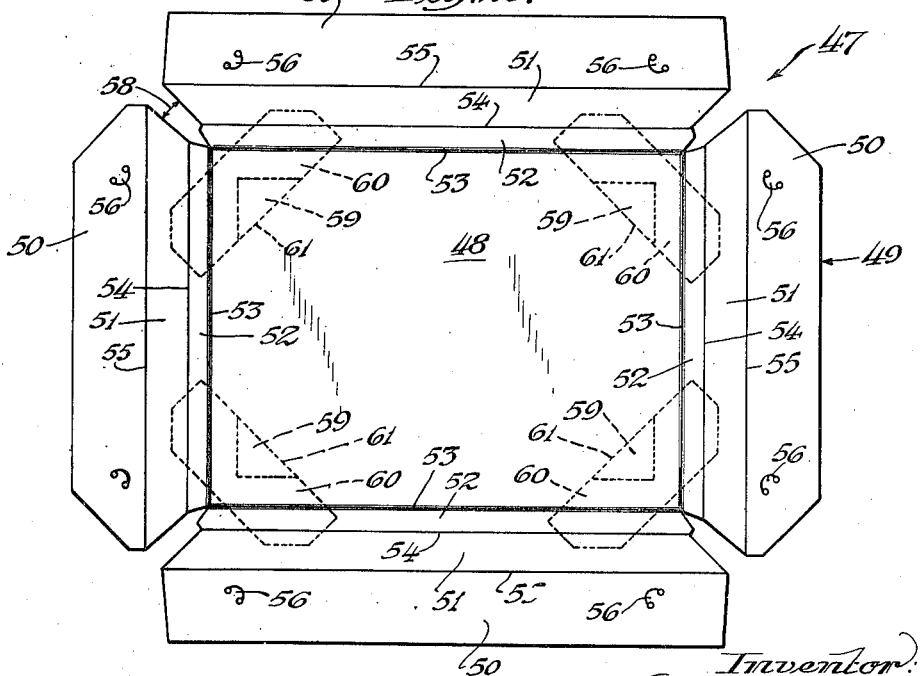
Fig. 25 is a blank development of the display illustrated in Figs. 20 to 24.

The blank illustrated in Fig. 25 is viewed from the front face thereof, and the score lines 53 are cut on its rear face and the score lines 54 and 55 are cut on the front face thereof. In assembling the blank 47 to form this display piece, the panels 49 are folded backwardly as viewed in Fig. 22 along the score lines 55 until the panels 50 lie in position in plane parallel relationship to the center panel 48 and closely adjacent the rear face thereof. This is the form the display takes in collapsed position as shown in Fig. 23.

Each of the outer panels 50 are provided with tongue-like anchor pieces 56 adjacent each of their ends. To set up the display the blank is folded as previously set forth and then a rubber band 57 is engaged over an adjacent pair of tongues 56 so as to extend angularly to and over the end portions of two adjacent panels 50, the rubber band being sufficiently short so as to engage and hold the panels under tension. Thus immediately upon application of a rubber band 57 to each of adjacent pairs of tongues 56 at each of the four corners of the rear face of the display, the tension of the bands draws the outermost side panels toward each other, thereby buckling the center panel 48 and the intermediate side panels 52 and 51.

This buckling effect is taken up by the score lines 53 and 54 whereby the panels 51 dispose themselves obliquely to the plane of the face of the central panel 48 at an angle determined by the cut out portions 58 defining the oblique angles of the adjacent ends of panels 51. As will be noted, the ends of the panels 52 are likewise in the form of oblique angular extensions, and although the angles at each of the ends of all of the side pieces may be equal so as to come into abutment predetermined by their own angularity, as for example, the intermediate panels 36 shown in Fig. 19, in the present modification one pair of opposed panels 52 have ends of greater angular projection than the opposed pair of panels. Thus upon the buckling of the side pieces under the tension of the bands 57, the limiting and defining position of the side pieces is determined primarily by the abutment of the side edges of the panels 51 and the side edges of the opposed pair of panels 52 having ends of lesser angularity, overlap and abut against the face, as opposed to the edge, of the other pair of opposed panels 52 which have ends of generally greater angular extension, to thus provide a partial auxiliary abutment means.

In this modification of my invention I likewise provide auxiliary bolster and abutment means for maintaining the set-up alignment of the several framing panels comprising the side pieces 49, presecured to the panel 48 in a manner similar to that shown and described in connection with the form illustrated in Figs. 14 to 19. This auxiliary abutment and aligning means comprises a strip of cardboard having a right triangular portion 59 secured to the rear face of the central panel 48 adjacent to and inwardly of the score lines 53 defining panel 48. This portion 59 is positioned and secured to the panel 48 whereby its two perpendicular sides are parallel to two adjacent sides of panel 58 and spaced inwardly a distance equal to that at which the outermost panels 50 normally come to rest under tension of the bands 57 in the limiting position of the panels 59 defined by the angle of the cut out portion 58, as will be observed in Fig. 21.

Superimposed over the abutment portion 59 is the portion 60 which may be a separate piece of cardboard or one which may be integral with the portion 59 overfolded on the line 61. The portion 59 may be secured to the panel 48 either by staples or adhesion and the portion 60 may be secured over the portion 59 in a like manner. The portion 60 comprises a generally rectangular strip extending obliquely over and laterally of the corners of the panel 48. This portion 60 provides an overlap serving as a guide for the panels 50 under the tension of the bands 57 and to maintain the panels in a position whereby they may effectively abut against the abutment member 59, and in general serves as a further auxiliary aid in guiding the movement of the component portions of the side pieces and to bolster them as an aid in framing alignment with the main panel 48.

Figs. 26 to 31 illustrate another form of collapsible cardboard display embodying my invention. This display comprises a blank generally indicated as 62 which consists of a central rectangular portion 63 to each side of which is integrally attached a side piece 64. Each side piece 64 comprises an outermost panel 65 and intermediate panels 66 and 67. A score line 68 divides the panels 67 from the main panel 63 and the score lines 69 and 70 divide the remaining panels.

The blank illustrated in Fig. 31 is viewed from the front face thereof, and the score lines 68 are cut on the rear face thereof and the score lines 69 and 70 are cut in the front face thereof. In assembling the blank 62 to form this display piece, the panels 65 are folded backwardly as viewed in Fig. 27 along the score lines 70 until the panels 65 lie in position in plane parallel relationship to the center panels 63 and closely adjacent the rear face thereof. This is the form the display takes in collapsed position as shown in Fig. 28.

Each of the outer panels 65 are provided with tongue-like anchor pieces 71 adjacent each of their ends. To set up the display the blank is folded as previously set forth and then a rubber band 72 is engaged over an adjacent pair of tongues 71 so as to extend angularly to and over the end portions of two adjacent panels 65, the rubber band being sufficiently short so as to engage and hold the panels under tension. Thus immediately upon application of the rubber band 72 to each of the adjacent pairs of tongues 71 at each of the four corners of the rear face of the display, the tension of the bands draws the outermost side panels 65 toward each other, thereby buckling the center panel 63 and the intermediate side panels 66 and 67, the buckling being taken up by the lines of fold 68 and 69, causing the panels 67 and 66 to assume an angular position with respect to the main panel 63, the said angular position being determined largely by the cut out portions 73 defining the oblique angles of the adjacent ends of the panels 66.

As will be noted, the ends of the panels 67 are of unequal angular extension and come together in an overlapping, as opposed to abutting, relationship in a manner like that of panels 52 of Fig. 19 previously described.

In this form of my invention I also provide an auxiliary bolster and abutment means presecured to the panel 63 for acting against the side pieces and for siding in limiting their relationships in the movement of the side pieces toward each other under the tension of the bands 72. This auxiliary abutment and aligning means comprises a member 75 which may suitably be of cardboard secured to the rear face of the central panel 63 at each of the corners thereof and may suitably be formed from the scrap resulting from cutting the blank 62 to form the corner or cut-out 73. This member 75 comprises a rectangular lateral extension, the sides of which are parallel to the defining edges of the main panel 63 and projects outwardly and beneath the folded panels 65 so as to abut against the fold lines 70 when the side pieces 64 normally come to rest under the tension of the bands 72 under the limiting abutment of the panels 66, defined by their end angles as will be observed in Fig. 30.

Thus it will be noted that each of the modified forms of construction herein described, for the purpose of economy of storage in shipment, all that is required to collapse the respective display pieces is to press the face of the center or main panel downwardly causing the main panel and the side piece components to lie in the same or adjacent parallel planes against the tension of the rubber bands, and upon release of the compression the displays will immediately extend and become self-set-up by the action of the engaged rubber bands.

From the foregoing, it will be evident to those skilled in the art that various changes in the details of construction and arrangements of parts may be made without departing from the spirit of my invention. Also, the rubber bands shown in the several modifications may comprise any suitable elastic member such as a coil spring, elastic tape, elastic cord, etc., although I have found that a good grade of rubber band is satisfactory for a long period of use. Likewise, instead of employing a continuous elastic band, an elastic strip may be used engaged to and extending obliquely between the ends of two adjacent panels. It will also be understood that instead of employing the highly desirable band engagement tongues, the opposed ends of the elastic member employed may be otherwise engaged, such as for example, by tying or knotting through a single opening in the panel end portions, or hook or other anchor means may take the place of tongue portions.

While the display devices disclosed herein have been described as having a rectangular main panel, it will be obvious that other polygonal-shaped main panels may be employed without departing from the spirit of the invention or the scope of the appended claims.

I claim as my invention:

1. In a collapsible display constructed of foldable material comprising a central rectangular panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels being adapted to extend parallel to said central panel in a plane spaced apart therefrom and the intermediate panels being adapted to extend angularly to said central panel and said outermost panels, anchoring means on said panel end portions, elastic members extending obliquely betwen the adjacent end portions of adjacent pairs of said outermost side panels engaged under tension with said anchoring means for buckling and yieldably maintaining the said panels in predetermined symmetrical relationship to each other, and means for limiting the buckling movement of said side pieces comprising oblique angularly extending side edge portions formed on said side pieces adapted to come into abutment under the tension of said elastic members.

2. In a collapsible display constructed of foldable material comprising a central rectangular panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels being adapted to extend parallel to said central panel in a plane spaced apart therefrom and rearwardly thereof and the intermediate panels being adapted to extend angularly to said central panel and said outermost panels, elastic members connected with and extending between adjacent end portions of said outermost side panels under tension acting to yieldably maintain the side panels in said relationships to the central panel, and abutment means extending beneath an opposed pair of said outermost panels for acting against said side pieces and for limiting said relationships.

3. In a collapsible display constructed of foldable material comprising a central rectangular panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels being adapted to extend parallel to said central panel in a plane spaced apart therefrom and rearwardly thereof and the intermediate panels being adapted to extend angularly to said central panel and said outermost panels, elastic members connected with and extending between adjacent end portions of said outermost side panels under tension acting to yieldably maintain the side panels in said relationships to the central panel, and abutment means extending beneath said outermost panels for acting against said side pieces and for limiting said relationships.

4. In a collapsible display constructed of foldable material comprising a central rectangular panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels being adapted to extend parallel to said central panel in a plane spaced apart therefrom and rearwardly thereof and the intermediate panels being adapted to extend angularly to said central panel and said outermost panels, elastic members connected with and extending between adjacent end portions of said outermost side panels under tension acting to yieldably maintain the side panels in said relationships to the central panel, and abutment means secured to the back of said central panel for acting against said side pieces and for limiting said relationships.

5. In a collapsible display constructed of foldable material comprising a central rectangular panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels being adapted to extend parallel to said central panel in a plane spaced apart therefrom and rearwardly thereof and the intermediate panels being adapted to extend angularly to said central panel and said outermost panels, elastic members connected with and extending between adjacent end portions of said outermost side panels under tension acting to yieldably maintain the side panels in said relationships to the central panel, and abutment means secured to the back of said central panel for acting against said outermost panels and for limiting said relationships.

6. In a collapsible display constructed of foldable material comprising a central rectangular panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels extending parallel to said central panel in a plane spaced apart therefrom and rearwardly thereof and the intermediate panels being adapted to extend angularly to said central panel and said outermost panels, elastic members connected with and extending between adjacent end portions of said outermost side panels under tension acting to yieldably draw opposite side pieces towards each other and to maintain the side panels in said relationships to the central panel, and abutment means secured to the back of said central panel for limiting the movement of said outermost panels parallel to said central panel.

7. In a collapsible display constructed of foldable material comprising a central rectangular panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels extending parallel to said central panel in a plane spaced apart therefrom and rearwardly thereof and the intermediate panels being adapted to extend angularly to said central panel and said outermost panels, elastic members engaged to and extending between adjacent end portions of said outermost side panels under tension acting to buckle said side pieces about said lines of fold and to draw opposite side pieces towards each other and to yieldably maintain the side panels in said relationships to the central panel, and means secured to the back of said central panel for limiting parallel movement of said outermost panels in relation to said central panel comprising a stop member for abutment of the longitudinal defining edges of said outermost panels and a confining member superimposed thereover for retaining said outer panel in operative relationship to said stop against the back of said central panel.

8. In a collapsible display constructed of foldable material comprising a central rectangular panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels being folded to extend parallel to said central panel in a plane spaced apart therefrom and the intermediate panels being adapted to extend angularly to said central panel and said outermost panels, elastic members extending obliquely between the adjacent end portions of adjacent pairs of said outermost side panels engaged under tension to anchoring means on said panel end portions for buckling and yieldably maintaining the said panels in predetermined symmetrical relationship to each other, said intermediate panels comprising oblique angularly extending side edge portions adapted to come into abutment under the tension of said elastic members and secondary abutment means acting against said side pieces to aid in maintaining said side edge abutting relationship.

9. In a collapsible display constructed of foldable material comprising a central rectangular panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels being folded to extend parallel to said central panel in a plane spaced apart therefrom and the intermediate panels being adapted to extend angularly to said central panel and said outermost panels, elastic members extending obliquely between the adjacent end portions of adjacent pairs of said outermost side panels engaged under tension to anchoring means on said panel end portions for buckling and yieldably maintaining the said panels in predetermined symmetrical relationship to each other, said intermediate panels comprising oblique angularly extending side edge portions adapted to come into abutment under the tension of said elastic members and secondary abutment means acting against said side pieces to aid in maintaining said side edge abutting relationship by limiting movement of the side pieces towards each other comprising members secured to the rear face of said central panel and projecting from its plane adjacent the corners thereof.

10. A collapsible display device constructed of foldable material comprising a substantially rectangular blank having a central panel, said blank being notched at each of its corners to provide side pieces adapted to be folded relative to said central panel, each of said side pieces having a fold line extending substantially parallel to the adjacent edge of said central panel, whereby to divide each of said side pieces into inner and outer side panels, said inner side panels being adapted to lie in a plane common to that of said central panel and said outer side panels being adapted to be folded rearwardly upon said inner panels with oppositely disposed outer side panels overlying the ends of the remaining two outer side panels when said display device is in a collapsed condition, and resilient means under tension overlying the overlapped portions of said outer side panels and tending to draw said outer side panels toward each other to automatically set up said display device from its collapsed condition with said inner side panels in non-parallel relation to said central panel.

11. A collapsible display device comprising: a polygonal-shaped blank having a central panel, said blank being notched at each of its corners to provide side pieces adapted to be folded relative to said central panel, the ends of said side pieces being cut upon an angle to limit the movement of said ends when said side pieces are raised to an angular position relative to said central panel, said side pieces including portions disposed in a plane common to that of said central panel when the display device is in a collapsed condition, resilient means anchored on each pair of said side pieces, said resilient means being under tension when the device is in collapsed condition and tending to draw the ends of said sides toward each other to automatically set up said display device from its collapsed condition.

12. A collapsible display device constructed of foldable material comprising a polygonal-shaped blank having a central panel, said blank being notched at each of its corners to provide side pieces adapted to be folded relative to said central panel, each of said side pieces having a fold line extending substantially parallel to the adjacent edge of said central panel, whereby to divide each of said side pieces into inner and outer side panels, said inner side panels being adapted to lie in a plane common to that of said central panel and said outer side panels being adapted to be folded against said inner panels when said display device is in a collapsed condition, and resilient means under tension connected to each pair of said outer side panels and tending to draw said outer side panels constituting each pair toward each other to automatically set up said display device from its collapsed condition with the inner side panels inclined relative to the plane of said central panel.

13. A collapsible display device constructed of foldable material comprising a substantially rectangular blank having a central panel, said blank being notched at each of its corners to provide side pieces adapted to be folded relative to said central panel, each of said side pieces having a fold line extending substantially parallel to the adjacent edge of said central panel, whereby to divide each of said side pieces into inner and outer side panels, said inner side panels being adapted to lie in a plane common to that of said central panel and said outer side panels being adapted to be folded rearwardly upon said inner panels when said display device is in a collapsed condition, and resilient means under tension connected with said outer side panels tending to draw certain of said outer side panels toward each other to automatically set up said display device from its collapsed condition with said inner side panels inclined relative to said central panel.

14. A collapsible display device constructed of foldable material comprising a substantially rectangular blank having a central panel, said blank being notched at its corners and having fold lines intersecting at said notches to provide side pieces foldably secured to each of the edges of said central panel, each of said side pieces having a fold line extending substantially parallel to the adjacent edge of said central panel and dividing each of said side pieces into inner and outer side panels, said inner side panels being inclined relative to the plane of said central panel and said outer side panels extending inwardly from said inner side panels and lying in a plane substantially parallel to that of said central panel with oppositely disposed outer side panels overlapping with the ends of the remaining two outer side panels and with the ends of said inner side panels forming a miter joint, and resilient means under tension connected with said outer side panels arranged to pull said outer side panels toward each other, the mitered ends of said inner side panels and the ends of the underlying outer side panels serving as abutments to limit the movement of said outer side panels toward each other.

15. A cardboard blank for a collapsible display device comprising a polygonal-shaped blank having a central panel, said blank being notched at each of its corners to provide side pieces adapted to be folded relative to said central panel, each of said side pieces having at least one fold line extending substantially parallel to the adjacent edge of said central panel, whereby to divide each of said side pieces into an inner side panel and an outer side panel, the ends of said inner side panels being cut to provide substantially a miter joint at the ends of said inner side panels when set up, each of said outer side panels having a tongue portion adapted to serve as an anchoring means for one end of a rubber band.

16. In a collapsible display constructed of foldable material comprising a polygonal-shaped central panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels being adapted to extend parallel to said central panel in a plane spaced apart therefrom and rearwardly thereof and the intermediate panels being adapted to extend angularly to said central panel and said outermost panels, elastic members connected with and extending between said outermost side panels under tension acting to yieldably maintain the side panels in said relationships to the central panel, and abutment means extending beneath an opposed pair of said outermost panels for acting against said side pieces and for limiting said relationships.

17. In a collapsible display constructed of foldable material comprising a polygonal-shaped central panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the intermediate side panels being adapted to extend angularly to said central panel and the outermost side panels being folded to extend rearwardly of said intermediate panels, elastic members extending obliquely between the adjacent end portions of adjacent pairs of said outermost side panels, anchoring means on said panel end portions engageable with said elastic members whereby said panels are buckled and yieldably maintained in predetermined symmetrical relationship to each other, said intermediate panels comprising oblique angularly extending side edge portions adapted to come into abutment under the tension of said elastic members and secondary abutment means acting against said side pieces to aid in maintaining said side edge abutting relationship.

18. In a collapsible display constructed of foldable material comprising a polygonal-shaped central panel, side pieces secured to the side edges of said central panel, said side pieces being foldable from the plane of said panel, each of said side pieces being provided with spaced lines of fold dividing each side piece into a plurality of elongated side panels disposed lengthwise with respect to the side edges of said central panel, the outermost side panels being folded to extend parallel to said central panel in a plane spaced apart therefrom and the intermediate panels being adapted to extend angularly to said central panel and said outermost side panels, elastic members extending between said outermost side panels connected thereto under tension for buckling and yieldably maintaining the said panels in predetermined symmetrical relationship to each other, said intermediate panels comprising oblique angularly extending side edge portions adapted to come into abutment under the tension of said elastic members and secondary abutment means acting against said side pieces to aid in maintaining said side edge abutting relationship.

19. In a cardboard display device, a main display area, trapezoidal panels hinged to the edges of said area, the hinged edge of each panel being shorter than the outer edge thereof and the base angles of said panels being such that by bringing their adjacent ends substantially into mutual abutment said panels will be inclined to the plane of said area and will define a beveled frame-like border for said area, rearwardly disposed flaps hinged to the outer edges of said panels and provided with curved slots defining integral tabs, and elastic means engaging said tabs to draw the panels yieldably into said inclined positions, said tabs being so arranged that the elastic means extends across the joint between adjacent panels and exerts at least a part of its effect in the outer region of said joint.

20. In a cardboard display device, a main display area, trapezoidal panels hinged to the edges of said area, the hinged edge of such panel being shorter than the outer edge thereof and the base angles of said panels being such that by bringing their adjacent ends substantially into mutual abutment said panels will be inclined to the plane of said area and will define a beveled frame-like border for said area, rearwardly disposed flaps hinged to the outer edges of said panels and provided with curved slots defining integral tabs, elastic means engaging said tabs to draw the panels yieldably into said inclined positions, and means for guiding the adjacent ends of said panels into mutual abutment.

21. A collapsible display device constructed of foldable material comprising a polygonal-shaped blank having a central panel, said blank being notched at each of its corners to provide side pieces adapted to be folded relative to said central panel, each of said side pieces having at least one fold line extending substantially parallel to the adjacent edge of said central panel, whereby to divide each of said side pieces into an inner narrow side panel and at least one relatively wide outer side panel, said inner side panels being adapted to lie in a plane common to that of said central panel and at least one of said outer side panels of each of said side pieces being adapted to be folded rearwardly relative to said inner panels so that the end portions of adjacent outer side panels overlap when said display device is in a collapsed condition, and resilient means under tension connected with said outer side panels and overlying the outer surface of said outer side panels and tending to draw said outer side panels toward each other in greater overlapping relation to automatically set up said display device from its collapsed condition with the inner side panels in non-parallel relation to said central panel.

22. A collapsible display device constructed of foldable material comprising: a polygonal-shaped blank having a central panel, said blank being notched at each of its corners and being provided with fold lines disposed substantially parallel to the outer edges thereof to provide a side foldably secured to each of the edges of said central panel, each of said side pieces having a fold line extending substantially parallel to the adjacent edge of said central panel, whereby to divide each side piece into inner and outer side panels, said inner side panels being inclined relative to said central panel and said outer side panels lying in a plane substantially parallel to that of said central panel, the ends of said inner side panels being cut so as to meet in a miter joint and to limit the inclination of said inner side panels relative to said central panel and the end portions of adjacent outer side panels being overlapped, and resilient means under tension overlying a portion of the outer surface of said outer side panels and connecting said outer side panels together and tending to draw said outer side panels toward each other in greater overlapping relation to maintain the display in the condition specified.

23. A collapsible display device comprising: a polygonal-shaped blank having a central panel, said blank being notched at each of its corners to provide side pieces adapted to be folded relative to said central panel, the ends of said sides being cut upon an angle to form a miter joint and limit the movement of said ends when said sides are raised to an angular position relative to said central panel, said sides including portions disposed in a plane common to that of said central panel when the display device is in a collapsed condition, and resilient means connected with said last-mentioned portions under tension when the device is in collapsed condition tending to draw the ends of said sides toward each other to automatically set up said display device from its collapsed condition.

24. A cardboard blank for a collapsible display device comprising a polygonal-shaped blank having a central panel, said blank being notched at each of its corners to provide side pieces adapted to be folded relative to said central panel, and means for maintaining the display device in set-up condition, each of said side pieces having anchor means adjacent each end thereof for cooperation with said first-mentioned means for maintaining the display device in a set-up condition, said anchor means comprising a tongue defined by a plurality of apertures and an arcuate cut interconnecting said apertures.

ARNOLD JOHNSON.